(12) United States Patent
Lin

(10) Patent No.: US 7,565,470 B2
(45) Date of Patent: Jul. 21, 2009

(54) SERIAL BUS DEVICE WITH ADDRESS ASSIGNMENT BY MASTER DEVICE

(75) Inventor: Yu Tang Lin, Hsinchu (TW)

(73) Assignee: Holylite Microelectronics Corp. (TW)

( * ) Notice: Subject to any disclaimer, the term of this patent is extended or adjusted under 35 U.S.C. 154(b) by 114 days.

(21) Appl. No.: 11/987,696

(22) Filed: Dec. 4, 2007

(65) Prior Publication Data

US 2009/0144471 A1   Jun. 4, 2009

(51) Int. Cl.
*G06F 13/40* (2006.01)
(52) U.S. Cl. .................. 710/110; 710/306; 710/309
(58) Field of Classification Search ......... 710/104–105, 710/110, 306–309, 311–317, 8–19, 36–38
See application file for complete search history.

(56) References Cited

U.S. PATENT DOCUMENTS 5,404,460 A * 4/1995 Thomsen et al. ............. 710/9
6,799,235 B2 * 9/2004 Bormann et al. ........... 710/110
6,912,606 B2 * 6/2005 Fay ............................ 710/64
6,928,501 B2 * 8/2005 Andreas et al. ............. 710/110

* cited by examiner

*Primary Examiner*—Raymond N Phan
(74) *Attorney, Agent, or Firm*—Bacon & Thomas, PLLC

(57) ABSTRACT

The present invention offers a daisy chain serial bus system. For bus construction, the slave device has a first data transmission port to transfer serial data with its upward connected device and a second data transmission port to transfer serial data with its downward connected device. The most upward slave device is connected to a master device. In each slave device, the input data from a first data transmission port is transferred to a data input gate in a second data transmission port. There is a control register in each slave device to control the data input gate of the second data transmission port. After the bus system has been started, only the slave device connected to the master device can receive the data from the master device, so that the master device can assign the first device address to the slave device connected to it, then, the master device can assign the second device address to the slave device next connected to the first slave device on the bus. By this way, the master device can assign the device address to each slave device on the bus one by one.

4 Claims, 7 Drawing Sheets

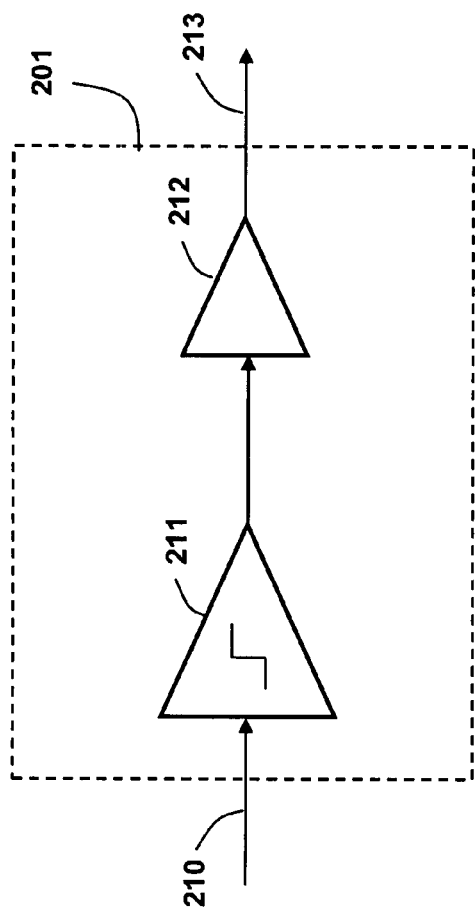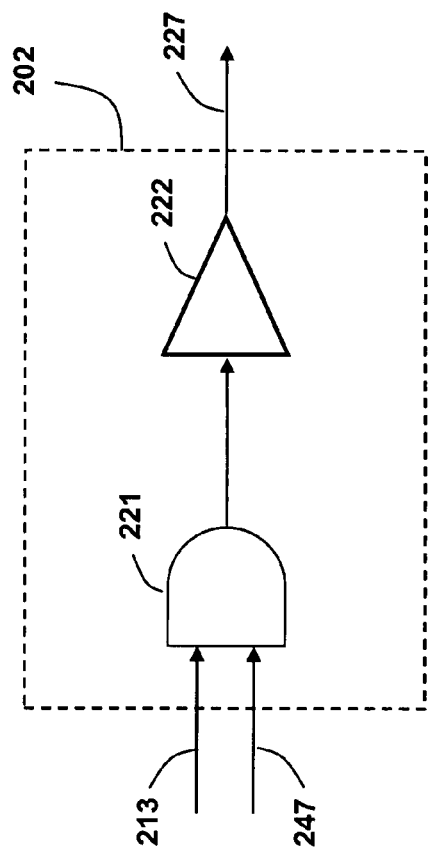

SERIAL BUS DEVICE WITH ADDRESS ASSIGNMENT BY MASTER DEVICE

BACKGROUND OF THE INVENTION

1. Field of the Invention

The present invention relates to a serial bus system, and more particularly to a slave device which receives the assignment of a device identification address from a master device on a daisy chain serial bus.

2. Description of the Related Art

For a communication system in which various devices are interconnected by a serial bus, it requires device identification address assigned in each device such that a message can be sent from a source device to a destination device. Ethernet developed by Xerox Corp., is a popular serial bus network system used in local area network. A unique 48-bit address is commonly pre-assigned to each Ethernet interface adapter device. The packet data of Ethernet frame includes a destination address field and a source address field.

LocalTalk developed by Apple Computer Inc., is a serial bus interface for interconnection between computers and computer peripheral devices such as key board, mouse, and printer. LocalTalk uses a dynamic device identification address assignment technique for a device to choose its own device address through a sequentially query procedures to find out a valid address when the device is connected on the bus.

Universal Serial Bus (USB) is a serial bus that supports data exchange between a host computer and a wide range of simultaneously accessible peripherals. This technology is used in U.S. Pat. No. 5,623,610 to Knoll et al., The root hub provides the connection between the Host Controller and one or more USB ports. The USB port is an attachment point for hub device or function device to connect with USB host. When an USB device is attached on an USB port, the device address is assigned by the USB host through a device configuration procedure.

Inter-Integrated Circuit (IIC) serial bus interface defined by Phillips Semiconductors is a 2-wire serial bus with a data wire and a clock wire. IIC is one of the popular serial bus interface scheme used to transfer data between various integrated circuit devices. The operation of data transfer is controlled by a master device and each slave device on the bus should have a unique device address pre-assigned for it.

U.S. Pat. No. 5,710,869 to Godefroy et al. teaches a daisy chain serially connected to the two adjacent neurons which distinguishes between the two possible states of the neuron circuit.

U.S. Pat. No. 6,799,235 B2 to Bormmann et al. teaches a serial daa transmission, a device determines if the serial data word is addressed to a first device having an address and to a second device if the serial data word is not addressed to the first device.

U.S. Pat. No. 7,013,355 B2 to Chambers teaches an incremental or bit by bit address decode scheme allows each device on a serial bus to determine if it is the device being addressed by the master device.

For serial bus device pre-assigned address at manufacture or set by user have no flexibility in installation. For which get device address automatically at connection needs more hardware and software costs and additionally limited only in two way communication architecture systems.

OBJECTS OF THE INVENTION

Therefore, It is an object of the present invention is to provide a simple and low cost serial bus system, in which the slave device address is assigned by the master device after the start of operation of the bus system.

It is another object of the invention to provide a serial bus system with address assignment by a master device for easy to install device in the bus system.

DISCLOSURE OF THE INVENTION

To achieve the object, the present invention defines a daisy chain serial bus system. For bus construction, the slave device has a first data transmission port to transfer serial data with its upward connected device and a second data transmission port to transfer serial data with its downward connected device. The most upward slave device is connected to a master device. The data packet output from the master device includes a control data field, a device address field and a device data field. In each slave device, the input data from a first data transmission port is transferred to a data input gate in a second data transmission port. If the data input gate is enabled, then the input data can be routed to a data driver of the second data transmission port and the next downward connected device can receive the data packet. If the data input gate is disabled, then the input data can not be routed to the data driver and the next downward connected device can not receive the data packet. There is a control register in each slave device to control the data input gate of the second data transmission port. The status of the control register can be controlled by control data in the data packet sent by the master device and is set to disable at the initial state when the bus system starts its operation. After the bus system has been started, only the slave device connected to the master device can receive the data from the master device, so that the master device can assign the first device address to the slave device connected to it and set the control register of this slave device in enable state. Then, the master device can assign the second device address to the slave device next connected to the first slave device on the bus. By this way, the master device can assign the device address to each slave device on the bus one by one. There on the master device can communicate with any slave device on the bus at any time through selection of device address in data packet.

The first aspect of the present invention is to teach A device communicating via a daisy chain connected to serial bus comprising: A first register for storing a first two-level control signal, the first two-level control signal is initially set at a first level state; A second register for storing a second two-level control signal, the second two-level control signal is initially set at a first level state; A first data transmission port connected to a first conducting path of a serial bus to receive the serial data transmitted on a first conducting path, the serial data including a control data, a device address and a device data; A second data transmission port connected to a second conducting path of the serial bus to send the serial data which is sent out from the output of the first data transmission port on the second conducting path if the first two-level control signal is at second level state; A device address register for storing a device address as device identification to the device; A controller responding to a first control data in the serial data which is sent out from the output of the first data transmission port to store the device address in the serial data into the device address register and set the first two-level control signal to second level state if the first two-level control signal is at the first level state, the controller further responding to a second control data in the serial data which is sent out from the output of the first data transmission port to set the first two-level control signal to the first level state if the first two-level control signal is at second level state. A device address comparator to compare the device address in the serial data which is sent out from the output of the first data transmission port with the device address stored in the device address register and set the second two-level control signal to the second level state if a match signal is detected, and set the second two-level control signal to the first level state if a no match signal is detected; A device data receiver to receive the device data from the serial data which is sent out from the output of the first data transmission port for further processing in said device if the second two-level control signal is at the second level state.

The second aspect of this invention is to impart a device communicating via a daisy chain connected to serial bus comprising: A first register for storing a first two-level control signal, the first two-level control signal is initially set at a first level state; A second register for storing a second two-level control signal, the second two-level control signal is initially set at a first level state; A third register for storing a third two-level control signal, the third two-level control signal is initially set at a first level state; A multiplexer comprising a first input, a second input and one output, the serial data input from the first input is sent to the output if the second two-level control signal is at a second level state, and the serial data input from the second input is sent to the output if the second two-level control signal is at the first level state; A first data transmission port connected to a first conducting path of a serial bus to receive the serial data transmitted on the first conducting path, the serial data including control data, a device address and a device data, and to send the serial data which is sent out from the output of the multiplexer on the first conducting path if the third two-level control signal is at the second level state; A second data transmission port connected to a second conducting path of the serial bus to receive the serial data transmitted on the second conducting path and output to the second input of the multiplexer, and to send the serial data which is sent out from the output of the first data transmission port on the second conducting path if the first two-level control signal is at the second level state and the third two-level control signal is at the first level state; A device address register for storing device address as device identification to the device; A controller responding to a first control data in the serial data which is sent out from the output of the first data transmission port to store device address in the serial data into said device address register and set the first two-level control signal to the second level state if the first two-level control signal is at the first level state; the controller further responding to a second control data included in the serial data which is sent out from the output of the first data transmission port to set the third two-level control signal to the second level state, and responding to a third control data included in the serial data which is sent out from the output of the first data transmission port to set the third two-level control signal to the first level state, the controller further responding to a fourth control data included in the serial data which is sent out from the output of the first data transmission port to set the first two-level control signal to the first level state if the first two-level control signal is at the second level state; A device address comparator to compare device address included in the serial data which is sent out from the output of the first data transmission port with device address stored in the device address register and set the second two-level control signal to the second level state if a match signal is detected, and set the second two-level control signal to the first level state if a no match signal is detected; A device data receiver to receive device data from the serial data which is sent out from the output of the first data transmission port for further processing in the device if the second two-level control signal is at the second level state; A device data transmitter to transmit the device data to the first input of the multiplexer if the second two-level control signal is at the second level state and the third two-level control signal is at the second level state.

BRIEF DESCRIPTION OF THE DRAWINGS

The foregoing and other advantages of the invention will be more fully understood with reference to the description of the best embodiment and the drawing wherein:

FIG. 5 is a block diagram of first data transmission port of unidirectional data bus interface.

FIG. 6 is a block diagram of second data transmission port of unidirectional data bus interface.

DESCRIPTION OF THE PREFERRED EMBODIMENTS

Figure 1:
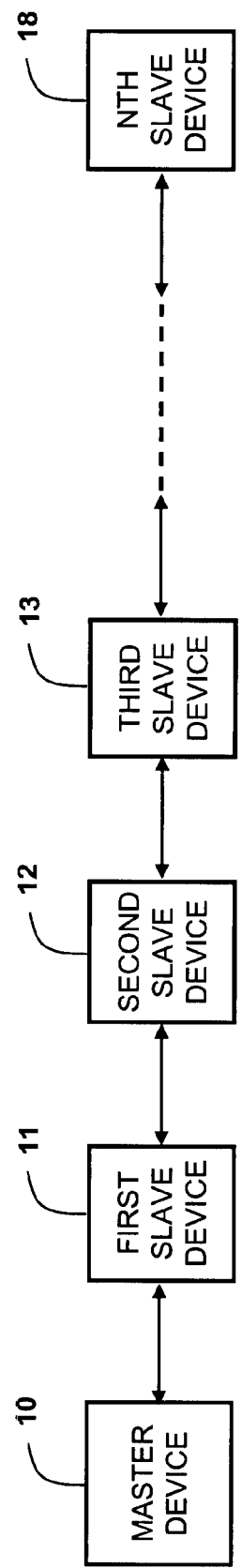
FIG. 1 is a daisy chain connected serial data bus structure of the patent.
Figure 2:
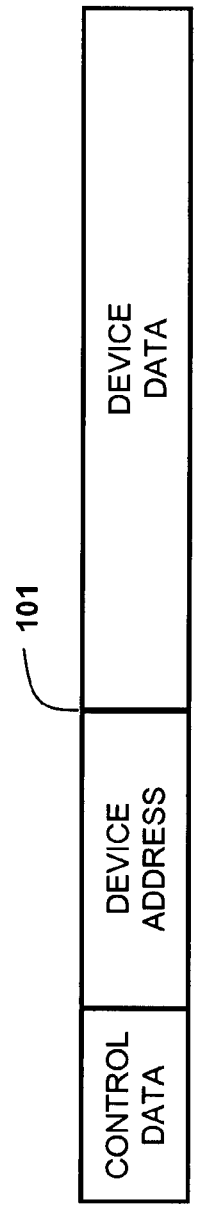
FIG. 2 is a diagram of serial data packet format.

FIG. 1 shows a daisy chain connected serial data bus structure of the invention. A master device 10 has a data transmission port wire connected to the first data transmission port of a first slave device 11. The second data transmission port of the first slave device 11 is wire connected to the first data transmission port of a second slave device 12. The second data transmission port of the second slave device 12 is wire connected to the first data transmission port of a third slave device 13. The second data transmission port of the third slave device 13 is wire connected to first data transmission port of a slave device (not shown) behind the third slave device 13. An nth slave device 18 is the last device connected on the serial data bus. The first data transmission port of the nth slave device 18 is wire connected to second data transmission port of the slave device in front of the nth slave device 18 and the second data transmission port of the nth slave device 18 is left open. The serial data packet format 101 shown in FIG. 2 is one example of the commonly data packet format used in data transmission on a serial data bus, the data packet consists of a control data field, a device address field, and a device data field.

Figure 3:
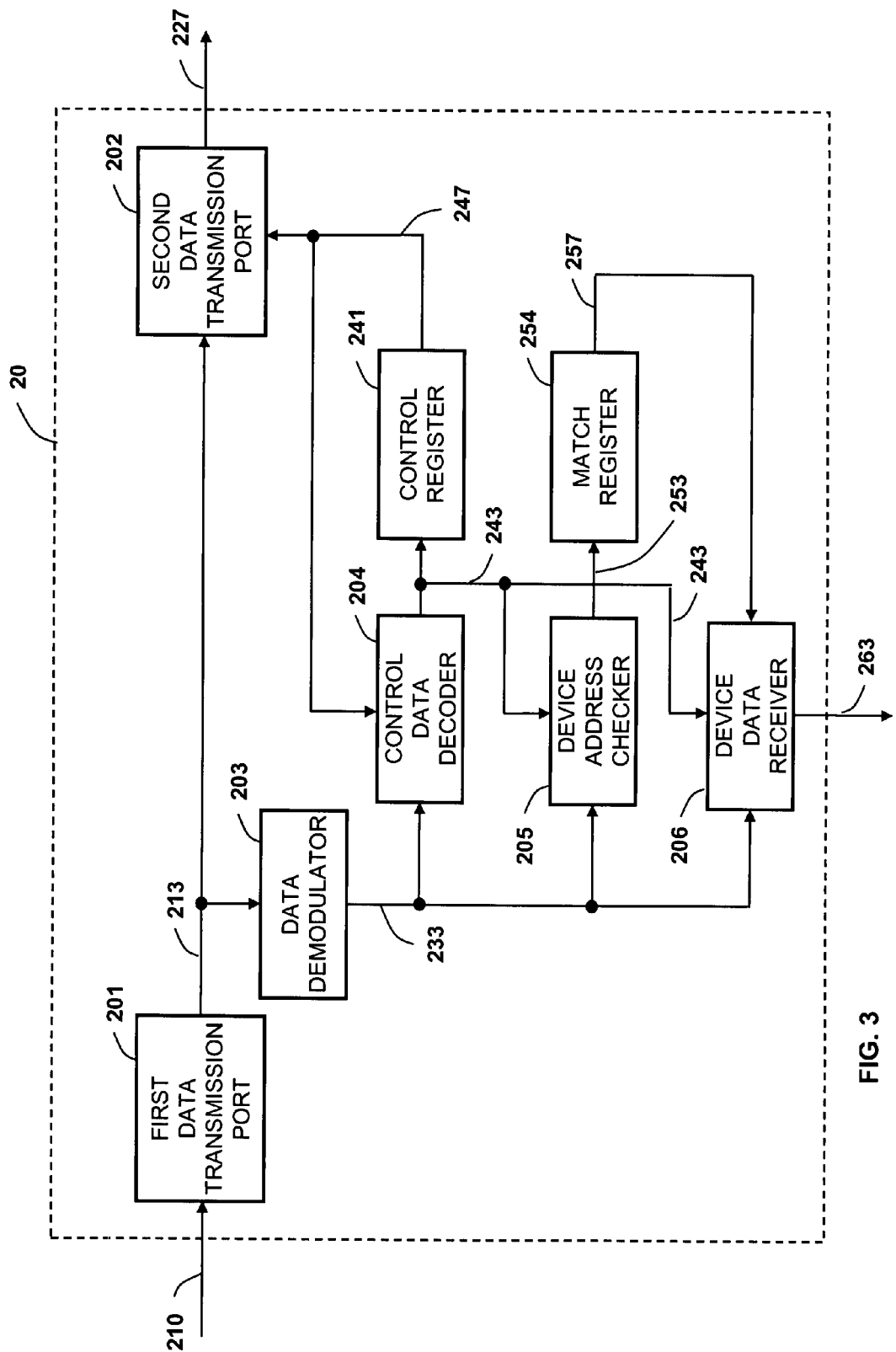
FIG. 3 is a block diagram of unidirectional data bus interface in according to one embodiment of the present invention.

A block diagram of a unidirectional data bus interface 20 shown in FIG. 3 is one embodiment of the present invention which will be built in a slave device to transfer data between a master device and slave devices. The first data transmission port 201 receives and reshapes the input serial data from connected the first external wire bus 210 by a data shaper 211

(see FIG. 5). Then the reshaped serial data 213 is transmitted to a data input gate 221 (see FIG. 6) of a second data transmission port 202 and to input of a data demodulator 203 through a data buffer 212 (see FIG. 5). The data demodulator 203 demodulates the input data back to raw data 233 according to the modulation format of the input data. The demodulated data 233 outputted from the data demodulator 203 are sent to control data decoder 204 and a device address checker 205 and a device data receiver 206 for further processing.

Figure 4:
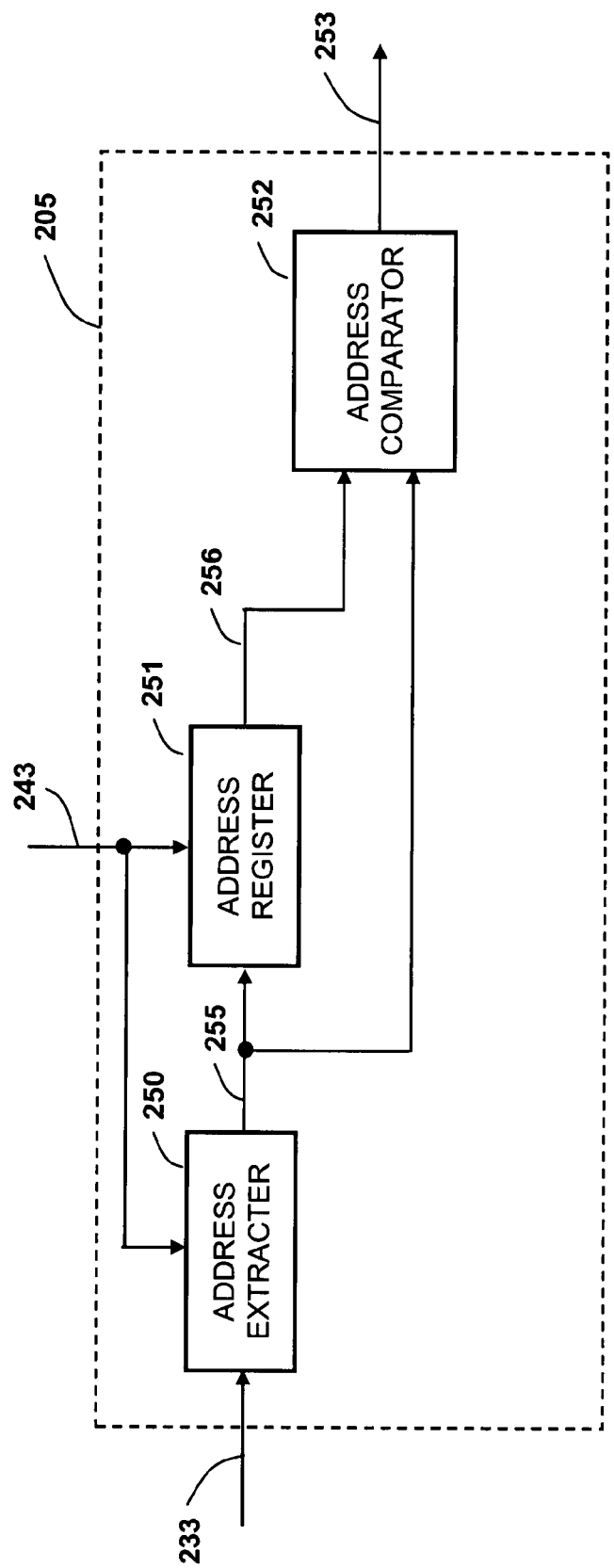
FIG. 4 is a block diagram of device address checker of unidirectional data bus interface.

At the initial state when the operation of the bus system is started, a control register 241 in the data bus interface 20 is set at a logic low state and the "Address Set" signal 247, the output of the control register 241 is at logic low state. Since the output of the control register 241 is connected to the enable pin of the data input gate 221 (see FIG. 6) of the second data transmission port 202, so no data can be sent out from data driver 222 (see FIG. 6) of the second data transmission port 202 and only the first slave device 11 can receive data sent out by the master device 10. By send out "Set Address" code in control data field of the data packet, the master device 10 assigns a specific device address in the device address data field to the first slave device 11. After the "Set Address" code is detected by the control data decoder 204, being controlled by the control signal 243 output from the control data decoder 204, the device address 255 (see FIG. 4) extracted by an address extractor 250 (see FIG. 4) in the device address checker 205 is stored into a device address register 251 (see FIG. 4) in the device address checker 205 and "Address Set" signal 247 is changed to logical high state. As "Address Set" signal 247 is at logical high state, the data input gate 221 (see FIG. 6) of the second data transmission port 202 is enabled and the serial data from the input can be sent out from the second data transmission port 202 to the second external wire bus 227 connected to a second slave device 12. Then the first data transmission port 201 of the second slave device 12 can receives the serial data packet sent from the master device 10 through the first slave device 11 directly. When the master device 10 send out a second "Set Address" code with the second device address data, the control data decoder 204 in the first slave device 11 will skip this second "Set Address" code under control of logical high state at "Address Set" signal 247 and no device address can be stored into the device address register 251 (see FIG. 4) of the first slave device 11 again. At the same time, the second "Set Address" code is detected by the control data decoder 204 of the second slave device 12 and the second device address is stored into the device address register 251 (see FIG. 4) of the second slave device 12 and the control register 241 of the second slave device 12 is set to logical high state. Now, the serial data packet sent out from the master device 10 can be passed through the first slave device 11 and the second slave device 12 to the first data transmission port 201 of a third slave device 13. Following the procedures described in the previous statement, by the same way the master device 10 can assign device address to each slave device daisy chain connected at the remain segments of the serial bus one by one and constructs the data connection path between the master device 10 and the slave devices on the bus. After the data connection path with the master device 10 is constructed, every slave devices start checking each serial data packet which is put on the bus by the master device 10. The device address 255 (see FIG. 4) extracted from the serial data packet is compare with the device address 256 (see FIG. 4) stored in the device address register 251 (see FIG. 4) by an address comparator 252 (see FIG. 4) in the device address checker 205, the result 253 output from the address comparator 252 (see FIG. 4) is stored in a match register 254. The match signal 257 output of match register 254 will be set to logical high state if an address match result is detected and set to logical low state when an address no match result is detected. The device data in the serial data packet is extracted out in the device data receiver 206 and sent to the internal circuit of a slave device by the data path 263 for further processing by a target slave device if match signal 257 is at logical high state.

The master device 10 can send out "Clear Address" code in the control data field of the serial data packet to clear device address of the target slave device and reassign a new device address to the target slave device on occasion. As the "Clear Address" code is detected by the control data decoder 204 of the target slave device, the control register 241 of the target slave device is reset to logical low state and the "Address Set" signal 247 of the target slave device is changed to logic low state. When the serial data packet contains "Set Address" code is put on bus by the master device 10, only the previous target slave device with "Address Set" signal 247 set at logic low state can receive the new device address and store this new device address into its device address register 251 (see FIG. 4).

Figure 7:
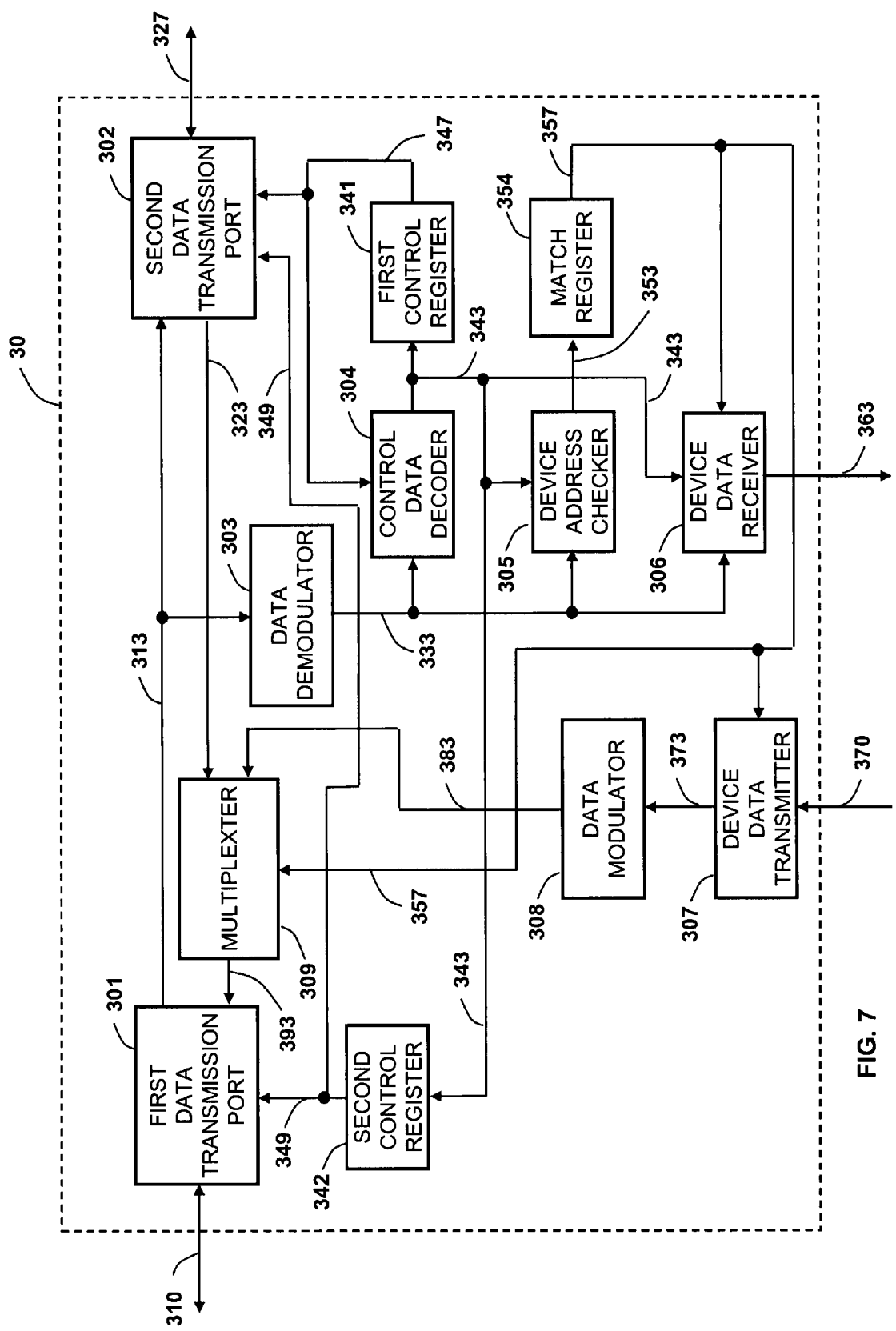
FIG. 7 is a block diagram of bidirectional data bus interface in according to one embodiment of the present invention.
Figure 9:
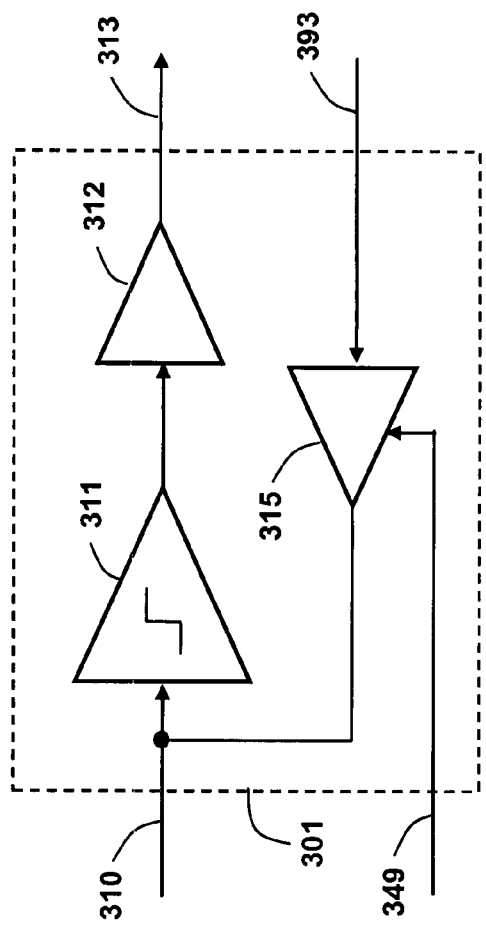
FIG. 9 is a block diagram of first data transmission port of bidirectional data bus interface.
Figure 10:
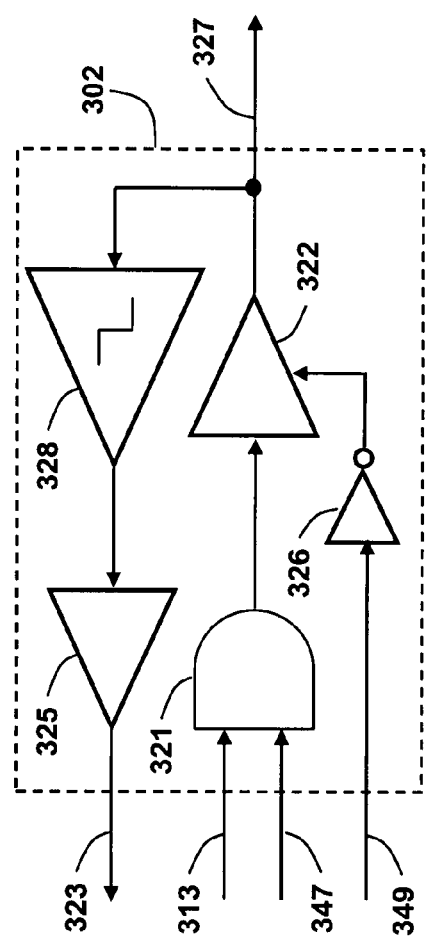
FIG. 10 is a block diagram of second data transmission port of bidirectional data bus interface.

Bidirectional data bus interface 30 shown in FIG. 7 is one of another embodiment of the present invention will be built in a slave device to transfer the data between the master device and the slave devices. The first data transmission port 301 receives and reshapes the input serial data from the connected first external wire bus 310 by a data shaper 311 (see FIG. 9). Then the reshaped serial data 313 is transmitted to a data input gate 321 (see FIG. 10) of a second data transmission port 302 and to the input of a data demodulator 303 through a data buffer 312 (see FIG. 9). The data demodulator 303 demodulates the input data back to a raw data 333 according to the modulation format of the input data. The demodulated data 333 outputted from the data demodulator 303 are sent to a control data decoder 304, a device address checker 305 and a device data receiver 306 for further processing.

Figure 8:
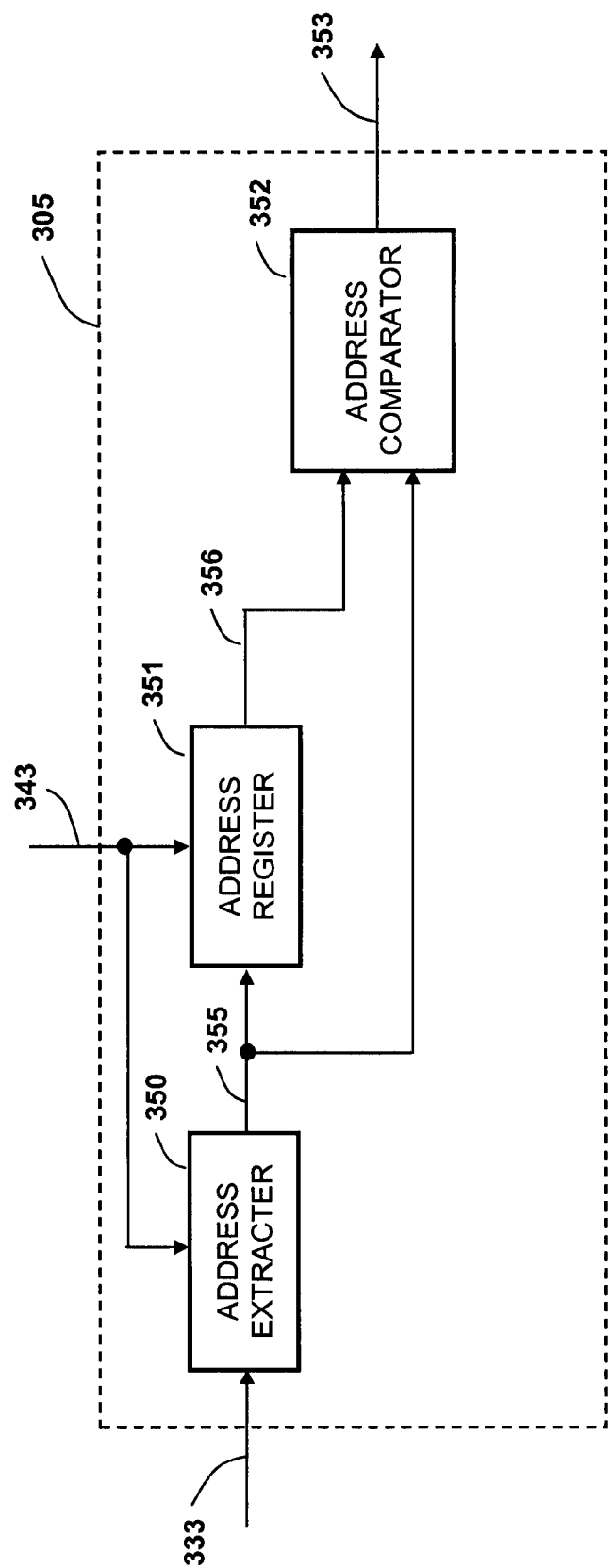
FIG. 8 is a block diagram of device address checker of bidirectional data bus interface.

At the initial state when the operation of the bus system is started, a first control register 341 and a second control register 342 in the data bus interface 30 are set at logic low state, so the "Address Set" signal 347 output of the first control register 341 and the "Up" signal 349 output of the second control register 342 are both at logic low state. Since the output of the first control register 341 is connected to the enable pin of the data input gate 321 (see FIG. 10) of the second data transmission port 302, so no data can be sent out from the data driver 322 (see FIG. 10) of the second data transmission port 302 and the data driver 315 (see FIG. 9) of the first data transmission port 301 is disable by logic low "Up" signal 349, so only the first slave device 11 can receive data sent out by the master device 10. By sending out "Set Address" code in the control data field of the data packet, the master device 10 assigns a specific device address in the device address data field to the first slave device 11. After the "Set Address" code is detected by the control data decoder 304, being controlled by a control signal 343 output from the control data decoder 304, a device address 355 (see FIG. 8) extracted by an address extractor 350 (see FIG. 8) in the device address checker 305 is stored into a device address register 351 (see FIG. 8) in the device address checker 305 and "Address Set" signal 347 and "Up" signal 349 are changed to logical high state. The "Match" signal 357 output of the match register 354 is set at logical high state after device address is stored. Then a device signal 373 responding to "Set Address" code is sent out from the device data transmitter 307. The signal 373 is modulated by the data modulator 308. The modulated signal 383 is sent to the first input of multiplexer 309. The signal 393 output from the multiplexer 309 selects the first input as its signal source while "Match" signal 357 is at logical high state. Since the data driver 315 (see FIG. 9) is enable when "Up" signal 349 is at logical high state, the device signal from the first slave device 11 is sent out from the first data transmission port 301 to the master device 10. Then "Up" signal 349 is reset to logical low state and the data driver 322 (see FIG. 10) is enabled through control of the output of the inverter 326 (see FIG. 10) in the second data transmission port 302. As "Address Set" signal 347 is at logical high state, the data input gate 321 (see FIG. 10) of the second data transmission port 302 is enabled and the serial data from the input can be sent out from the second data transmission port 302 to a second external wire bus 327 connected to the second slave device 12. Then the first data transmission port 301 of the second slave device 12 can receives the serial data packet sent from the master device 10 through the first slave device 11 directly. When the master device 10 send out a second "Set Address" code with the second device address data, the control data decoder 304 in the first slave device 11 will skip this second "Set Address" code under control of logical high state at "Address Set" signal 347 and no device address can be stored into the device address register 351 (see FIG. 8) of the first slave device 11 again, and the match signal 357 of the first slave device 11 is at logical low state so that the signal 393 output from the multiplexer 309 selects the second input as its signal source. At the same time, the second "Set Address" code is detected by the control data decoder 304 of the second slave device 12 and the second device address is stored into the device address register 351 (see FIG. 8) of the second slave device 12 and the control register 341 of the second slave device 12 is set to logical high state. When the device signal from the second slave device 12 is sent out from its first data transmission port 301 to the second data transmission port 302 of the first slave device 11, the signal is reshaped by the data shaper 328 (see FIG. 10) and sent out by the data buffer 325 (see FIG. 10) to the second input of multiplexer 309 in the first slave device 11. Finally, the device signal from the second slave device 12 is sent to the master device 10 through the first data transmission port 301 of the first slave device 11. Now, the serial data packet sent out from the master device 10 can be passed through the first slave device 11 and the second slave device 12 to the first data transmission port 301 of a third slave device 13. Following the procedures described in the previous statement, by the same way the master device 10 can assign device address to each slave device daisy chain connected at the remain segments of the serial bus one by one and constructs the data connection path between the master device 10 and the slave devices on the bus. After the data connection path with master device 10 is constructed, every slave devices start checking each serial data packet which is put on the bus by the master device 10. The device address 355 (see FIG. 8) extracted from serial data packet is compared with the device address 356 (see FIG. 8) stored in the device address register 351 (see FIG. 8) by an address comparator 352 (see FIG. 8) in device address checker 305, the result 353 output from the address comparator 352 (see FIG. 8) is stored in a match register 354. The match signal 357 output of the match register 354 will be set to logical high state if an address match result is detected and set to logical low state when an address no match result is detected. The device data in the serial data packet is extracted out in the device data receiver 306 and sent to the internal circuit of the slave device by a data path 363 for further processing by the target slave device if match signal 357 is at logical high state, and the device data generated from the internal circuit of the slave device is sent to the master device 10 through the data path 370.

The master device 10 can send out "Clear Address" code in the control data field of the serial data packet to clear the device address of the target slave device and reassigns a new device address to the target slave device on occasion. As the "Clear Address" code is detected by the control data decoder 304 of the target slave device, the control register 341 of the target slave device is reset to logical low state and the "Address Set" signal 347 of the target slave device is changed to logic low state. When the serial data packet contains "Set Address" code is put on the bus by the master device 10, only the previous target slave device with "Address Set" signal 347 set at logic low state can receive the new device address and store this new device address into its device address register 351 (see FIG. 8).

Although the embodiments of data bus interface of the unidirectional serial data bus system and the bidirectional serial data bus system of the present invention have been described in details, it is no limit to the implementation of the present invention in other ways.

What is claimed is:

1. A device communicating via a daisy chain connected to serial bus comprising:
a first register for storing a first two-level control signal, the first two-level control signal is initially set at a first level state;
a second register for storing a second two-level control signal, the second two-level control signal is initially set at a first level state;
a first data transmission port connected to a first conducting path of a serial bus to receive the serial data transmitted on a first conducting path, the serial data including a control data, a device address and a device data;
a second data transmission port connected to a second conducting path of said serial bus to send the serial data which is sent out from the output of said first data transmission port on said second conducting path if the first two-level control signal is at second level state;
a device address register for storing a device address as device identification to said device;
a controller responding to a first control data in the serial data which is sent out from the output of said first data transmission port to store the device address in said serial data into said device address register and set the first two-level control signal to second level state if the first two-level control signal is at the first level state;
a device address comparator to compare the device address in the serial data which is sent out from the output of said first data transmission port with the device address stored in said device address register and set the second two-level control signal to the second level state if a match signal is detected, and set
the second two-level control signal to the first level state if a no match signal is detected;
a device data receiver to receive the device data from the serial data which is sent out from the output of said first data transmission port for further processing in said device if
the second two-level control signal is at the second level state.

2. A device as claimed in claim 1, wherein said controller further responding to a second control data in the serial data which is sent out from the output of said first data transmission port to set the first two-level control signal to the first level state if the first two-level control signal is at second level state.

3. A device communicating via a daisy chain connected to serial bus comprising:
- a first register for storing a first two-level control signal, the first two-level control signal is initially set at a first level state;
- a second register for storing a second two-level control signal, the second two-level control signal is initially set at a first level state;
- a third register for storing a third two-level control signal, the third two-level control signal is initially set at a first level state;
- a multiplexer comprising a first input, a second input and one output, the serial data input from the first input is sent to the output if the second two-level control signal is at a second level state, and the serial data input from the second input is sent to the output if the second two-level control signal is at the first level state;
- a first data transmission port connected to a first conducting path of a serial bus to receive the serial data transmitted on the first conducting path, the serial data including control data, a device address and a device data, and to send the serial data which is sent out from the output of said multiplexer on the first conducting path if the third two-level control signal is at the second level state;
- a second data transmission port connected to a second conducting path of said serial bus to receive the serial data transmitted on the second conducting path and output to the second input of said multiplexer, and to send the serial data which is sent out from the output of said first data transmission port on said second conducting path if the first two-level control signal is at the second level state and the third two-level control signal is at the first level state;
- a device address register for storing device address as device identification to said device;
- a controller responding to a first control data in the serial data which is sent out from the output of said first data transmission port to store device address in the serial data into said device address register and set the first two-level control signal to the second level state if the first two-level control signal is at the first level state;
- said controller further responding to a second control data included in the serial data which is sent out from the output of said first data transmission port to set the third two-level control signal to the second level state, and responding to a third control data included in the serial data which is sent out from the output of said first data transmission port to set the third two-level control signal to the first level state;
- a device address comparator to compare device address included in the serial data which is sent out from the output of said first data transmission port with device address stored in said device address register and set the second two-level control signal to the second level state if a match signal is detected, and set the second two-level control signal to the first level state if a no match signal is detected;
- a device data receiver to receive device data from the serial data which is sent out from the output of said first data transmission port for further processing in said device if the second two-level control signal is at the second level state;
- a device data transmitter to transmit the device data to the first input of said multiplexer if the second two-level control signal is at the second level state and the third two-level control signal is at the second level state.

4. A device as claimed in claim 3, wherein said controller further responding to a fourth control data included in the serial data which is sent out from the output of said first data transmission port to set the first two-level control signal to the first level state if the first two-level control signal is at the second level state.

* * * * *